Nov. 22, 1966 R. F. GIUSTI 3,286,748
MULTI-PURPOSE SAW ATTACHMENT
Filed Oct. 30, 1964 2 Sheets-Sheet 1
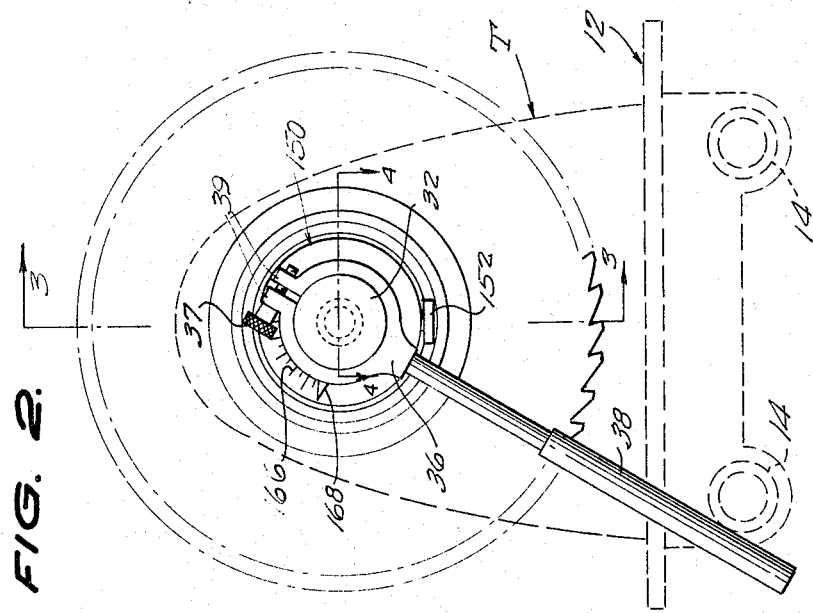
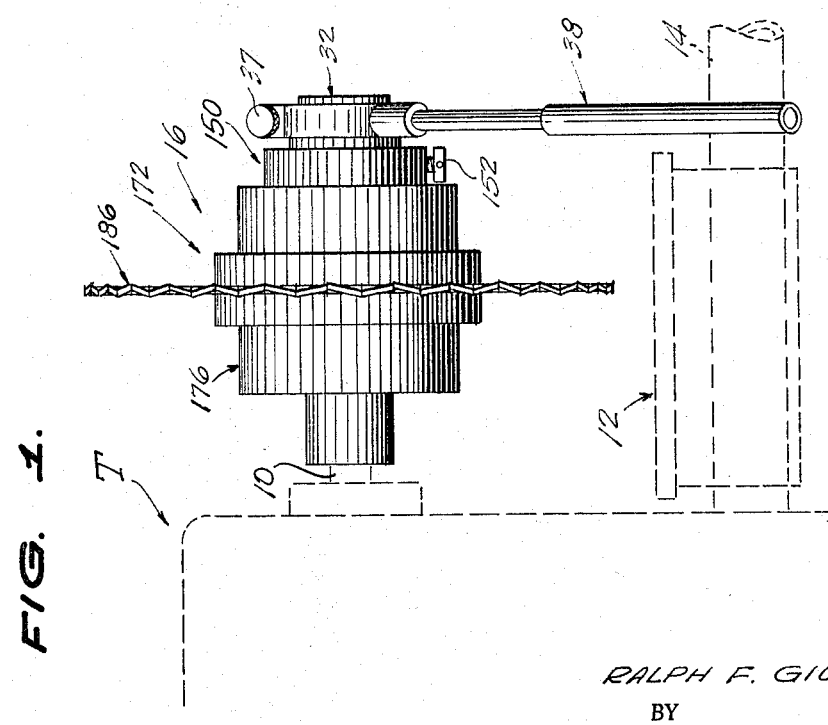
INVENTOR.
RALPH F. GIUSTI,
BY
Berman, Davidson & Berman
ATTORNEYS.

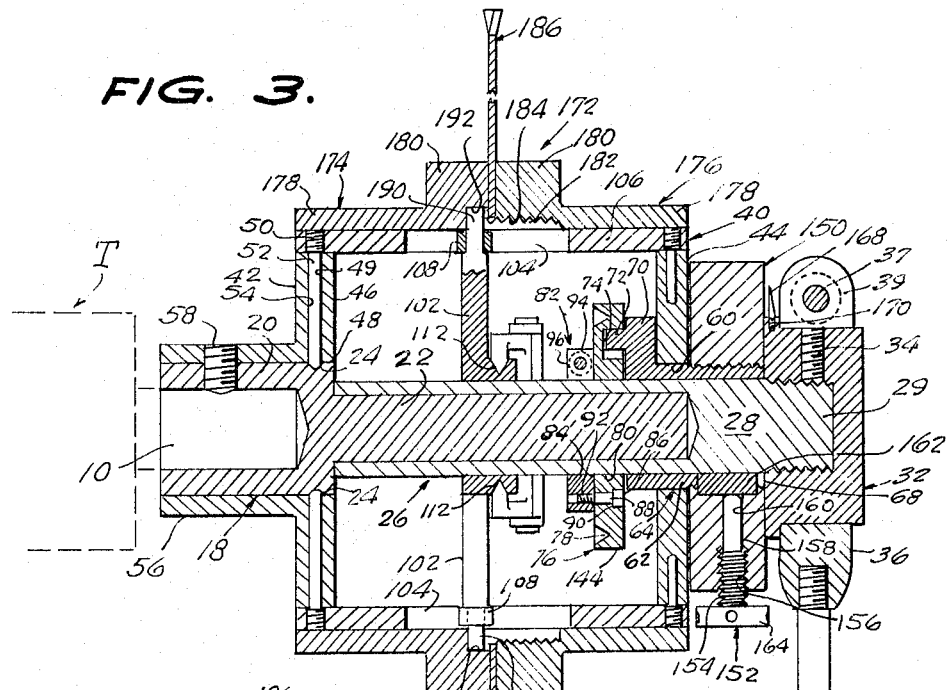
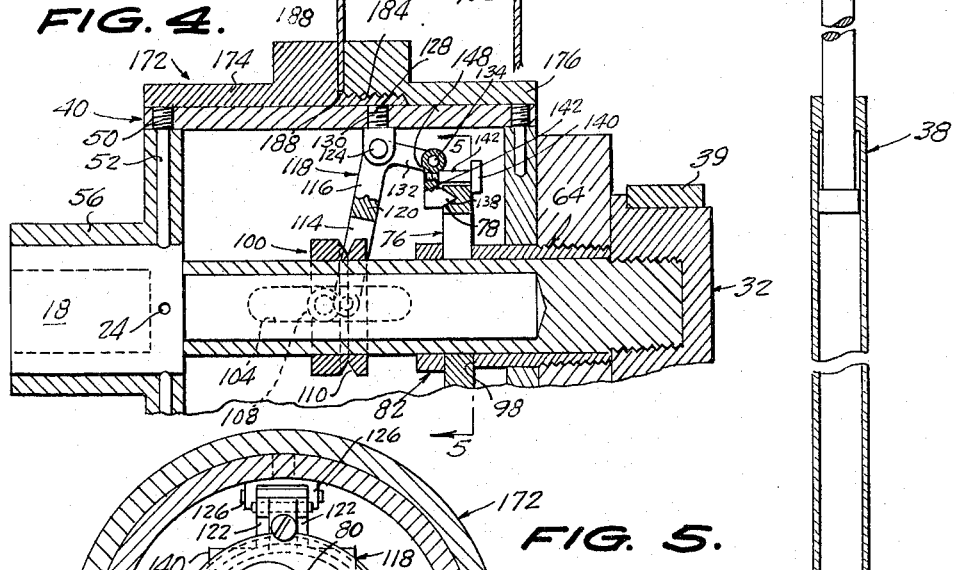
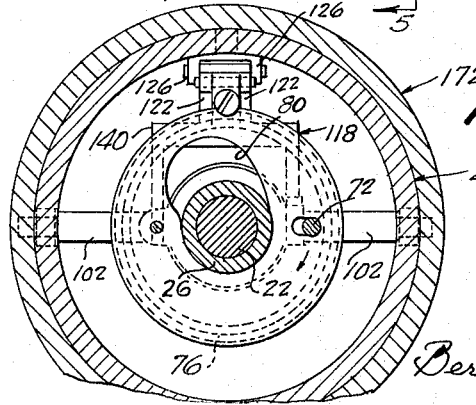

United States Patent Office 3,286,748
Patented Nov. 22, 1966

3,286,748
MULTI-PURPOSE SAW ATTACHMENT
Ralph F. Giusti, 1705 8th Ave., Yuma, Ariz.
Filed Oct. 30, 1964, Ser. No. 407,807
10 Claims. (Cl. 144—238)

This invention relates to a disc saw attachment, for power tools, designed for dadoing and other cutting operations.

The primary object of the invention is the provision of a multi-purpose attachment of the kind indicated, which not only provides more accurate and more finished dado cuts, of different selected widths, but which provides for use of its blade for other cutting operations, without a change of blades, which latter use is not possible with router or dadoing blades which in their operation, angle relative to the axis of the blades.

Another object of the invention is the provision of an attachment of the character indicated above, wherein the blade, instead of being "wobbled" as in present attachments, is reciprocated, from side to side of its median position, in parallel planes normal to the axis of the blade; and wherein, contrary to safe practice, the blade can be, if desired, adjusted for cutting dados of different width, without first halting rotation of the blade.

In the drawings:

FIGURE 1 is a side elevation of an attachment of the present invention, installed on a power tool, shown in phantom lines;

FIGURE 2 is a right-hand end elevation of FIGURE 1;

FIGURE 3 is a vertical longitudinal section taken on the line 3—3 of FIGURE 2;

FIGURE 4 is a fragmentary horizontal section taken on the line 4—4 of FIGURE 2; and FIGURE 5 is a fragmentary vertical transverse section taken on the line 5—5 of FIGURE 4.

Referring in detail to the drawings, T generally designates a conventional form of tool, such as a Shop-Smith, having a lateral longitudinal power shaft 10 extending therefrom, over a table 12, which slides on spaced longitudinal rails 14.

The illustrated attachment 16, while shown installed on a Shop-Smith power tool T, is readily adaptable to other forms of power tools.

The attachment 16 comprises a drive shaft 18 which has a relatively short bored portion 20, which engages on the power tool power shaft 10, and a relatively long, reduced diameter solid portion 22. At the outer end of the short portion 20 the same is formed with four lateral indexing recesses 24.

A tubular static shaft 26 is engaged on the solid drive shaft portion 22, whose inner end abuts the inner end of the short portion 20. The static shaft 26 has a solid portion 28, at its outer end, which terminates in an externally threaded terminal 29. A circular cap nut or reaction hub 32 is threaded on the terminal 29, and is locked in place thereon, by a set screw 34. A split clamp 36 is clamped around the reaction hub 32, and has an elongated, lengthwise adjustable reaction rod 38 extending radially therefrom, which is freely engaged in stop relation, to any suitable part of the power tool T, at the outer side of one of the rails 14, whereby any build-up of reaction in the static components of the attachment, due to rotation of the drive shaft 18, is canceled out. A clamping thumb screw 37 is threaded through the halves 39 of the clamp 36.

A hollow plain cylindrical open-ended carrier hub 40 spacedly and concentrically surrounds the drive shaft 18 and the static shaft 26, whose ends are closed by inner and outer heads 42 and 44, respectively.

The inner hub head 42 comprises a disc 46 having a central opening 48, which receives the outer end of the short portion 20 of the drive shaft 18, with screws 49 threaded, at their outer ends, as indicated at 50, in the carrier hub, and having smooth portions 52, extending through bores 54, in the head 42, into related ones of the indexing recesses 24. An inwardly extending sleeve 56, on the head 42, also receives the drive shaft portion 20, and a set screw 58 is threaded through the sleeve 56 and the sidewall of the shaft portion 20, against the power tool shaft 10. With this arrangement, the carrier hub 40 is secured to rotate with the power shaft 10.

The outer carrier hub head 44 is like the inner head 42 and is similarly secured to the hub, and is formed with a central opening 60, which receives the smooth intermediate portion 62 of a cam adjuster sleeve 64, rotatable on the static shaft 26, which has an externally threaded outer end portion 66 which extends outwardly from the outer hub head 44. The outer end 68 of the end portion 66 abuts the inner side of the reaction hub 32.

The adjuster sleeve 64 is formed, at its inner end, with a lateral arm 70 having an eccentrically positioned adjusting pin 72 which extends from the inner side of the arm 70, and engages loosely in a socket 74, formed in the outer side of a circular cam plate 76.

The cam plate 76 is formed, in its inward side, with an annular concentric V-shaped groove 78; and with a central opening 80, which receives the static shaft 26. As shown in FIGURE 5, the cam plate opening 80 is oval.

A circular cam plate bracket 82, having a central opening 84, which receives the static shaft 26, is positioned against the inner side of the cam plate 76. The cam plate 76 is pivotally secured to the bracket 82, by means of a headed pivot pin 86, having a smooth shank 88 extending through a smooth counterbore 90, through the cam plate, and having a threaded terminal 92, threaded in the bracket, the head of the pin 86 being flush with the outer side of the cam plate 76.

The cam plate bracket 82 is in the form of a split clamp, which is clamped on the static shaft 26, by means of a screw 94 extending through the halves 96 of the split clamp, as indicated in FIGURE 3. The bracket 82 serves to confine the cam plate 76 between itself and the inner end 98 of the adjuster sleeve 64.

A circular slide 100 is circumposed on the static or reaction shaft 26, inwardly of the bracket 82, and has a pair of laterally extending diametrically opposed arms 102 extending therefrom and through and outwardly beyond a pair of longitudinally elongated slots 104, formed in the sidewall 106 of the carrier hub 40. The arms 102 have anti-friction rollers 108, adjacent to their outer ends, which work in the slots 104.

The slide 100 is formed with a peripheral V-shaped groove 110, in which are conformably engaged V-shaped shoes 112, extending laterally inwardly from parallel spaced pendant legs 114 of an inverted V-shaped lever 116 of a bell crank 118. The bell crank 118 has a cross member 120 joining the upper ends of the legs 114, from the center of which rises a pair of laterally spaced lugs 122 which are traversed by a pivot pin 124. The pin 124 extends also through spaced pendant ears 126, between which the lugs 122 are positioned, the ears 126 being components of a stud 128, which is threaded, as indicated, at 130, up into the sidewall of the carrier hub 40, at a location spaced inwardly from the cam plate 76.

The bell crank 118 further comprises a pair of laterally spaced, outwardly extending lever arms 132, whose outer ends are pivoted, as indicated at 134, the standard 136 having an outwardly extending V-shaped shoe 138, at its lower end, which engages in the groove 78 of the cam plate 76. As shown in FIGURE 4, the shoe standard 136 is fixed, relative to the cam plate 76, by means of a headed guide pin 140.

As shown in FIGURE 4, the guide pin 140 has a smooth shank 142, which bears against the peripheral edge 144 of the cam plate 76, an enlarged diameter head 146, which bears against the outer side of the cam plate, and the shank 142 terminates in a threaded terminal 148, which is threaded into the shoe standard 136.

A circular cam adjusting knob 150 is threaded on the threaded portion 66 of the adjuster sleeve 64, between the outer carrier hub head 44 and the reaction hub 32, and bears thereagainst. The knob 150 is adapted to be releasably locked to the adjuster sleeve 64, by means of a manual screw 152. The screw 152, as shown in FIGURE 3, has an outer threaded portion 154, which is threaded in a counterbore 156, opening to the periphery of the knob 150, and a reduced diameter smooth inner portion 158, which extends through a smooth bore 160, for engagement with a pad 162, which directly engages the sleeve 64. The pad 162 is compressed between the knob and the sleeve, so as to effectively connect them for rotation together, as well as with the reaction tube. An enlarged diameter knurled head 164 is provided on the outer end of the screw 152.

As shown in FIGURE 2, the outer surface of the knob 150 is formed with a circumferential adjustment scale 166, to which a pointer 168 refers. The pointer 168, as shown in FIGURE 3, is preferably secured, as indicated at 170, into the peripheral surface of the reaction hub 32.

A tubular cylindrical blade carrier 172, of substantially the same length as the carrier hub 40, is slidably circumposed thereon. The blade carrier comprises inner and outer sections 174 and 176, respectively, which are substantially similar in construction, and are reversed with respect to each other, both sections having relatively small cross section outer wall portions 178, and relatively large cross section inner wall portions 180.

The inner blade carrier section 174 has a reduced diameter externally threaded extension 182, extending beyond its inner wall portion 180, which threads into an internally threaded socket 184, formed in the inner end portion of the outer section 176, for assembling the sections 174 and 176, and for clamping between their inner end portions, a disc saw blade 186. The opening 188 of the blade 186 receives the threaded extension 182. The smooth tips 190 of the arms 102 of the slide 100 engage in sockets 192, formed in the inner surface of the enlarged cross section inner end portion 180 of the inner blade corner section 174.

Because the saw blade 186 is adapted, in accordance with the present invention, for cutting grooves the width of the kerf of the saw blade, as well as for cutting dados of predetermined widths greater than the thickness of the blade, a stiff carbide-tipped blade can be used, as a multipurpose blade, which does not require to be changed for different cutting operations.

In use and operation, with the cam plate adjusting knob 150 adjusted, so that the zero end of the scale 166 is at the pointer 168, the cam plate 76 is concentric with the static sleeve 26. Rotation of the saw blade 186 is confined to a median position and there is no endwise movement of the blade. In this median position the blade 186 cuts a groove in the work, only as wide as its kerf.

When the adjusting scale is at zero, relative to the pointer, the cam plate is concentric with the axis of the shaft 22. Rotation of the cam adjusting knob, on the adjuster sleeve 64, so that a graduation of the scale 166, away from the zero end of the scale, registers with the pointer 168, causes the adjuster sleeve 64 to move inwardly a corresponding distance, from the starting or zero position, shown in FIGURE 3. This inward movement of the adjuster sleeve 64 moves the cam plate 76 into a corresponding eccentric relationship to the static shaft 26, and this causes the bell crank 118 to oscillate, on the axis of the pin 124, to a degree corresponding to the position of the adjuster sleeve 64, with the result that the slide 100 is reciprocated on the static shaft 26, and the saw blade carrier 176 is correspondingly reciprocated, as is the saw blade 186, to opposite sides of the above mentioned median position of the saw blade. The scale 166 indicates the width of the cut to be made by the saw blade.

The rotating saw blade 186 continues reciprocating alternately to opposite sides of its median position, while engaged with the work, the blade maintained at all times normal to its axis and in parallel planes, so that a clean, parallel-sided cut is made in the work, with the width of the cut corresponding to the amount of adjustment, away from zero position, of the adjusting knob 150. The bottom of the cut is normal to the parallel sides of the cut.

What is claimed is:

1. An attachment of the character described, comprising a drive shaft adapted to be fixed on a power shaft, a tubular static shaft engaged on the drive shaft, torque reaction eliminating means connected to the static shaft, a hollow cylindrical carrier hub having inner and outer heads, the inner head being circumposed on and fixed to the drive shaft, the outer head being formed with a central opening surrounding and larger in diameter than the static shaft, a cam plate adjuster sleeve movable circumposed on the static shaft and extending through the opening of the outer carrier hub head, a cam plate adjusting knob threaded on the adjuster sleeve between the outer carrier hub head and said torque reaction means, means connecting the adjuster sleeve and the adjusting knob to rotate together, a releasable thumb screw traversing the knob and securably engaging the adjuster sleeve, a lateral arm on the adjuster sleeve inwardly of the outer carrier hub head, said arm having an inwardly extending cam follower pin, a tubular cylindrical blade carrier slidably circumposed on the carrier hub, a disc saw blade surrounding and fixed to the blade carrier and positioned in a plane normal to the axis of the carrier hub, a cam plate formed with a radially elongated opening receiving the static shaft, said cam plate being formed in its outer side with a socket receiving the said cam follower pin, a bracket surrounding and secured to the static shaft and engaged with the inner side of the cam plate, the inner side of the cam plate being formed with a circular cam groove, means eccentrically pivoting the cam plate to the bracket, cam shoe means engaged in the cam groove, bell crank means pivoted on the sidewall of the carrier hub, said bell crank means being operatively connected to said cam shoe means, slide means circumposed on the static shaft to which the bell crank means is operatively connected, the sidewall of the carrier hub being formed with opposed longitudinal slots, said slide having fixed radial arms extending through the slots and operatively engaged with the blade carrier.

2. The attachment of claim 1, wherein the blade carrier comprises inner and outer threadably connected portions, the saw blade being clamped between these portions.

3. The attachment of claim 1, wherein the blade carrier comprises inner and outer threadably connected portions, the saw blade being clamped between these portions, one of the carrier portions being formed with a socket in which the ends of the slide arms are operatively engaged.

4. The attachment of claim 1, wherein said adjusting knob is held against longitudinal movement relative to the adjuster shaft by engagement with the outer carrier hub head and the torque reaction eliminating means, whereby rotary adjustments of the knob produce rotation of the adjusting sleeve from a starting position, the cam plate being initially in a starting position concentric with the adjuster sleeve to positions eccentric with respect to the static shaft, the bell crank means being adapted to oscillate from the starting position of the adjuster sleeve and being adapted to reciprocate the blade carrier in adjusted positions of the adjuster sleeve.

5. The attachment of claim 1, wherein said torque reaction eliminating means comprises a reaction hub circumposed on and fixed to the static shaft at the outer end of the latter, and a radial reaction rod fixed to the reaction hub and adapted to be engaged with a support.

6. The attachment of claim 1, wherein said slide is circular and is formed with a peripheral groove, said bell crank means having opposed inwardly extending shoes engaged in the peripheral groove at opposite sides of the slide.

7. The attachment of claim 1, wherein said slide is circular and is formed with a peripheral groove, said bell crank means having opposed inwardly extending shoes engaged in the peripheral groove at opposite sides of the slide, the bell crank means being pivoted to the same shoe means.

8. The attachment of claim 1, wherein said slide is circular and is formed with a peripheral groove, said bell crank means having opposed inwardly extending shoes engaged in the peripheral groove at opposite sides of the slide, the bell crank means being pivoted to the cam shoe means, said cam plate being circular, guide pin means eccentrically connected to the cam shoe means and engaged with the peripheral edge of the cam plate, said guide pin means having an enlarged diameter head engaged with the outer side of the cam plate.

9. The attachment of claim 1, wherein said torque reaction eliminating means comprises a reaction hub circumposed on and fixed to the static shaft at the outer end of the latter, and a radial reaction rod fixed to the reaction hub and adapted to be engaged with a support, and releasable clamp means embracing the reaction hub to which the reaction rod is fixed.

10. The attachment of claim 1, wherein said torque reaction eliminating means comprises a reaction hub circumposed on and fixed to the static shaft at the outer end of the latter, and radial reaction rod fixed to the reaction hub and adapted to be engaged with a support, and releasable clamp means embracing the reaction hub to which the reaction rod is fixed, said reaction hub having a radial pointer, and a circumferential scale on the outer side of the cam adjusting knob to which the pointer refers, the scale having a zero end corresponding to the concentric starting position of the cam plate wherein oscillation of the bell crank means is absent.

References Cited by the Examiner

UNITED STATES PATENTS

| | | | |
|---|---|---|---|
| 1,952,653 | 3/1934 | Brown | 51—34.9 |
| 2,462,022 | 2/1949 | Hedman | 144—238 |

DONALD R. SCHRAN, *Primary Examiner.*